United States Patent
Mock, Sr. et al.

(10) Patent No.: US 7,065,803 B2
(45) Date of Patent: Jun. 27, 2006

(54) METHOD OF DISPENSING CYANURIC ACID

(75) Inventors: James Richard Mock, Sr., Bloomington, MN (US); Roy Siqueiros, Peoria, AZ (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 10/091,634

(22) Filed: Mar. 5, 2002

(65) Prior Publication Data

US 2003/0172450 A1   Sep. 18, 2003

(51) Int. Cl.
*E04H 4/00* (2006.01)
*E03D 9/02* (2006.01)

(52) U.S. Cl. .................. 4/496; 4/490; 4/222; 222/190; 422/264; 422/278

(58) Field of Classification Search .................. 4/496, 4/490, 222; 222/190; 422/264, 278
See application file for complete search history.

(56) References Cited

U.S. PATENT DOCUMENTS

| | | | | |
|---|---|---|---|---|
| 2,826,484 A | * | 3/1958 | Buehler | 422/265 |
| 2,976,129 A | * | 3/1961 | Buehler | 422/265 |
| 3,595,786 A | * | 7/1971 | Horvath | 210/198.1 |
| 3,684,460 A | * | 8/1972 | Arneson | 422/265 |
| 3,772,193 A | * | 11/1973 | Nelli et al. | 210/756 |
| 3,792,979 A | * | 2/1974 | Clinton | 422/265 |
| 3,846,078 A | * | 11/1974 | Brett | 422/264 |
| 4,115,270 A | * | 9/1978 | Phillips | 210/169 |
| 4,181,702 A | * | 1/1980 | Watson | 422/265 |
| 4,217,331 A | * | 8/1980 | Schaub | 422/265 |
| 4,250,910 A | * | 2/1981 | King | 137/268 |
| 4,546,503 A | * | 10/1985 | Casberg | 4/496 |
| 4,555,347 A | * | 11/1985 | O'Dowd et al. | 210/752 |
| D297,857 S | * | 9/1988 | Alexander et al. | D23/207 |
| 4,780,197 A | * | 10/1988 | Schuman | 210/136 |
| 4,828,803 A | * | 5/1989 | Nicholson et al. | 422/264 |
| 4,917,868 A | * | 4/1990 | Alexander et al. | 422/119 |
| 5,064,624 A | * | 11/1991 | King | 422/264 |
| D328,332 S | * | 7/1992 | Fink | D23/208 |
| D328,333 S | * | 7/1992 | Casberg | D23/208 |
| 5,178,181 A | * | 1/1993 | Craig | 137/268 |
| 5,441,711 A | * | 8/1995 | Drewery | 422/264 |
| 5,507,945 A | * | 4/1996 | Hansen | 210/198.1 |
| 5,525,223 A | * | 6/1996 | Butler | 210/202 |
| 5,666,987 A | * | 9/1997 | Combs | 137/1 |
| 5,795,551 A | * | 8/1998 | Powell | 422/264 |
| 5,888,386 A | * | 3/1999 | Enright et al. | 210/169 |
| 5,976,385 A | * | 11/1999 | King | 210/754 |
| D428,198 S | * | 7/2000 | Beaujean | D28/8.1 |
| 6,508,929 B1 | * | 1/2003 | Mercer | 205/701 |

* cited by examiner

*Primary Examiner*—Henry Bennett
*Assistant Examiner*—Nihir Patel
(74) *Attorney, Agent, or Firm*—IPLM Group, P.A.

(57) ABSTRACT

A preferred embodiment method for dispensing a product (121) such as cyanuric acid into an existing swimming pool circulation system includes providing a product (121) placed within a permeable bag (120). The permeable bag (120) containing the product (121) is placed into a cavity (104) of a flood feeder (100) having an inlet (105) and an outlet (108). The inlet (105) and the outlet (108) are in fluid communication with the cavity (104) of the feeder (100). A diluent is supplied to the inlet (105) and the diluent is allowed to flood the cavity (104) thereby contacting the permeable bag (120) and dissolving a portion of the product (121) to create a use solution within the cavity (104). The use solution is allowed to exit the cavity (104) through the outlet (108) and to flow into the swimming pool.

20 Claims, 4 Drawing Sheets

METHOD OF DISPENSING CYANURIC ACID

BACKGROUND OF THE INVENTION

1. Field of the Invention

The present invention relates to a method of dispensing cyanuric acid, and more particularly, a method of dispensing cyanuric acid into swimming pools.

2. Description of the Prior Art

Cyanuric acid is commonly used in swimming pools to stabilize chlorine, which is added to sanitize the swimming pool, against decomposition from ultra-violet ray exposure. When cyanuric acid is maintained at proper levels in a swimming pool, the amounts of both chlorine and cyanuric acid are conserved because less of these products are required to maintain sanitary conditions in the swimming pool. In outdoor swimming pools in particular, sunlight decomposes chlorine rapidly thereby requiring frequent replenishment of the chlorine to maintain sanitary conditions of the swimming pool. Otherwise, more bacteria will be present in the afternoon thereby creating a potential health risk in the swimming pool.

It is well known that 25 to 50 ppm of cyanuric acid complexes the chlorine and stabilizes it against decomposition. Cyanuric acid has a solubility in water of only approximately 2,000 ppm, and it is typically used in a powder or a granular form. The usual method of dispensing cyanuric acid into swimming pools is to "broadcast" the powder or granules over the surface of the pool water. In other words, the cyanuric acid is thrown over the top of the water and will eventually sink to the bottom of the pool. Approximately 6 to 8 hours later, the cyanuric acid will completely dissolve. However, operators are not prone to utilize the cyanuric acid in this manner when it would be most beneficial because broadcasting the cyanuric acid while the pool is in use would be objectionable to the users. Not only could the powder or granules adhere to the users' skin, hair, and/or swimwear and potentially harm the users but it could also feel rough to the users' feet. In addition, the cyanuric acid could stain or erode the plaster on the bottom of the swimming pool and etch the soft metals used in the pool circulation system. In addition, chlorine and cyanuric acid cannot be added to the swimming pool together because a chemical reaction will occur. However, once each is put into a use solution, the cyanuric acid effectively stabilizes the chlorine. Therefore, a feeder method of dispensing the cyanuric acid is desirable to provide a way to add the product during normal operating hours of the swimming pool.

SUMMARY OF THE INVENTION

In a preferred embodiment method of dispensing a product into a swimming pool, a product is provided and placed into a permeable bag. The permeable bag containing the product is placed into a cavity of a feeder having an inlet and an outlet. The inlet and the outlet are in fluid communication with the cavity. Water is supplied to the inlet and allowed to flood the cavity thereby dissolving a portion of the product to create a use solution. The use solution is then allowed to exit the cavity through the outlet and flow into a swimming pool.

In another preferred embodiment method of dispensing a product into a swimming pool, a product is provided. A feeder having a water inlet, a cavity, and a use solution outlet is also provided. The water inlet and the use solution outlet are in fluid communication with the cavity. A permeable member is placed between the product and the use solution outlet, wherein the permeable member prevents the product from exiting the cavity through the use solution outlet. The product is placed in the cavity, and water is supplied to the water inlet, wherein water enters the cavity and dissolves a portion of the product thereby creating a use solution. The use solution is allowed to exit the cavity through the use solution outlet and flow into the swimming pool.

In a preferred embodiment method of stabilizing chlorine in a swimming pool, cyanuric acid is placed into a cavity of a container having an inlet and an outlet. The inlet and the outlet are in fluid communication with the cavity. The container is supplied with a diluent, and the diluent enters the cavity via the inlet and dissolves a portion of the cyanuric acid thereby creating a use solution. The use solution is allowed to exit the cavity via the outlet, and the use solution is dispensed into the swimming pool, wherein the cyanuric acid stabilizes the chlorine in the swimming pool.

In another preferred embodiment method of stabilizing chlorine in a swimming pool, the swimming pool includes a circulation system having a water pump, a filter, and a heater. A feeder has an inlet, a cavity, and an outlet. The inlet is connected to the circulation system between the water pump and the filter with a first conduit, and the outlet is connected to the circulation system after the heater with a second conduit. Cyanuric acid is placed into the cavity of the feeder, and means for preventing the cyanuric acid from flowing out of the outlet in a solid form is provided. The cavity is flooded with water received from the circulation system via the inlet, and a portion of the cyanuric acid is dissolved thereby creating a use solution. The use solution is allowed to exit the outlet, and the use solution is routed into the swimming pool.

In a preferred embodiment method of packaging cyanuric acid for dispensing the cyanuric acid from the packaging, a desired quantity of cyanuric acid is placed into a permeable bag, wherein the permeable bag has a dispensing rate of approximately 0.2 to 1.40 pounds of cyanuric acid per hour. An opening of the permeable bag is sealed thereby containing the cyanuric acid, wherein fine particles of the cyanuric acid may escape from the permeable bag.

In a preferred embodiment packaging for dispensing cyanuric acid, a permeable bag contains a cyanuric acid product, and the permeable bag has a dispensing rate of approximately 0.2 to 1.40 pounds of cyanuric acid per hour.

DETAILED DESCRIPTION OF THE PREFERRED EMBODIMENT

A preferred embodiment flood feeder and a preferred embodiment product dispensing bag are constructed according to the principles of the present invention and are designated by the numbers 100 and 120, respectively.

Figure 2:
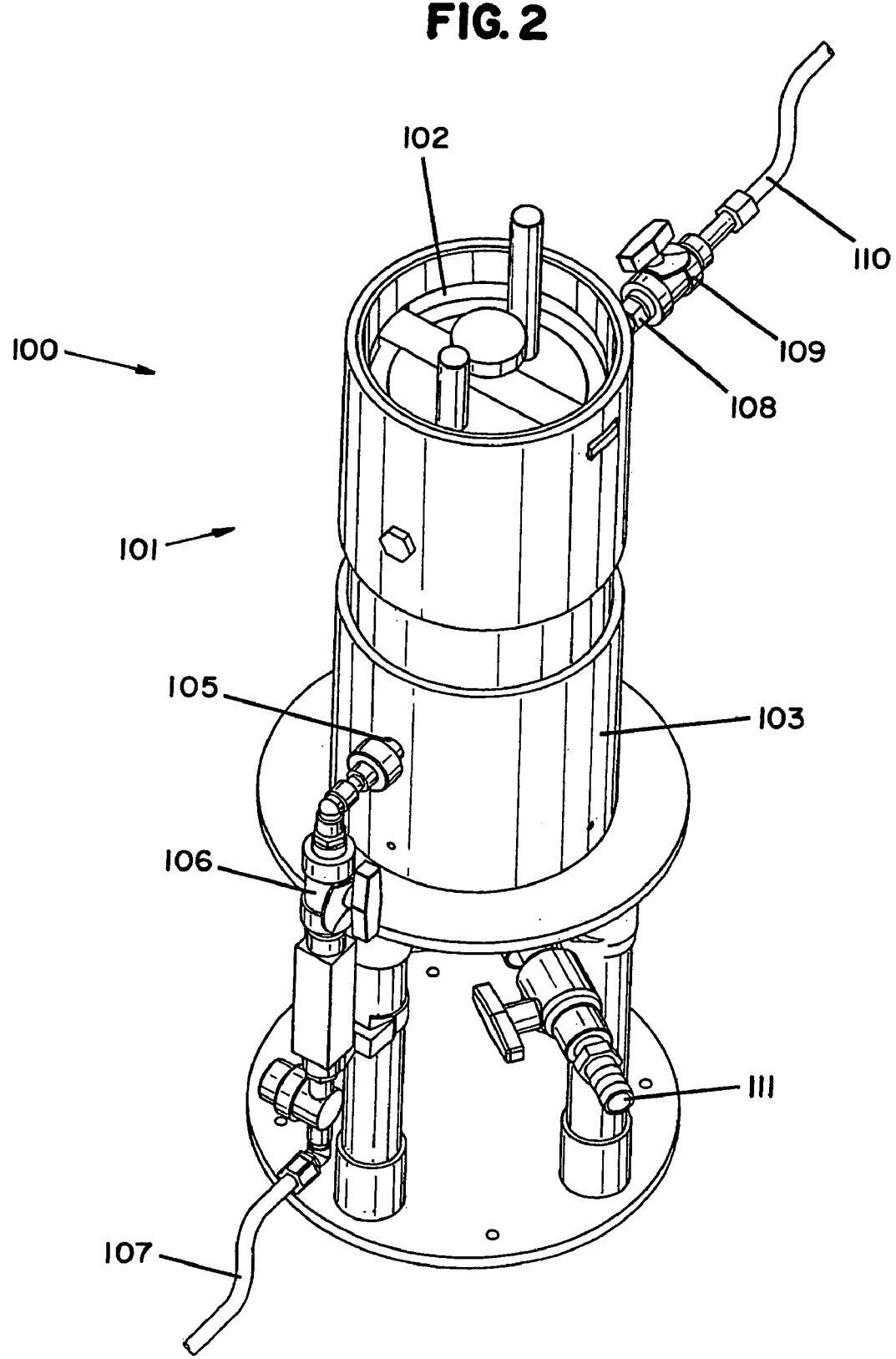
FIG. 2 is a perspective view of a cyanuric acid feeder constructed according to the principles of the present invention.

The present invention is a method of dispensing cyanuric acid into a swimming pool that utilizes chlorine as the sanitizing agent to stabilize the chlorine. The method utilizes a container such as a flood feeder 100 and a product dispensing bag 120 to dispense the cyanuric acid. As shown in FIG. 2, the flood feeder 100 includes a cylindrical housing 101 having a top 102, a bottom 103, and a cavity 104. The top 102 includes an opening that allows access to the cavity 104. Proximate the bottom 103 of the housing 101 is a water inlet 105, and a valve 106 regulates how much water enters the cavity 104 through the inlet 105. A hose 107 is connected to the inlet 105. Proximate the top 102 of the housing 101 is a use solution outlet 108, and a valve 109 regulates how much use solution exits the cavity 104 through the outlet 108. A hose 110 is connected to the outlet 108. In the preferred embodiment, a half-inch tubing is connected to both the inlet 105 and the outlet 108, as hose 107 and hose 110, respectively. Hose 107 delivers water to the inlet 105 and hose 110 delivers use solution from the outlet 108. A drain 111 is located proximate the bottom 103 of the housing 101, and the drain 111 allows the flood feeder 100 to be easily emptied of water and use solution. One feature of the flood feeder 100 is that the outlet 108 is positioned proximate the top 102 of the housing 101, and this ensures that the whole product-filled stocking or bag 120 remains immersed in water and that the product 121 will sufficiently go into solution. The preferred embodiment flood feeder 100 has a height of 32 inches, a width of 13 inches, and a depth of 17 inches.

The product dispensing bag 120 contains product 121 and is a flow-through bag allowing the product 121 to be dispensed through the bag 120. Fine particles of the product may escape from the product dispensing bag 120. However, the product dispensing bag 120 prevents product particles from flowing intact or un-dissolved into the swimming pool and also prevents the feeder outlet from becoming clogged with product sediment. The preferred embodiment product dispensing bag 120 contains a desired quantity of product 121 thereby eliminating the step of measuring the product 121 before placing it in the feeder 100. This also eliminates the possibility of spilling the product 121 while measuring and/or placing the product 121 in the feeder 100. The preferred embodiment utilizes a pre-packaged mesh bag 120 containing 5 pounds of cyanuric acid, and a depleted product bag 120 is simply replaced with a new product bag 120. Again, this eliminates the need for operators to handle the product 121 and the need to broadcast the product 121 during non-use periods of the swimming pool.

Using the feeder 100 without placing a permeable member such as a bag 120 or a mesh cap-like member 119 between the product 121 and the outlet 108 essentially distributes the product 121 into the swimming pool until the outlet hose 110 becomes clogged and is therefore undesirable. The bag 120 or the mesh member 119 should be porous and permeable with a mesh size of approximately 30 to 60 mesh.

Figure 3:
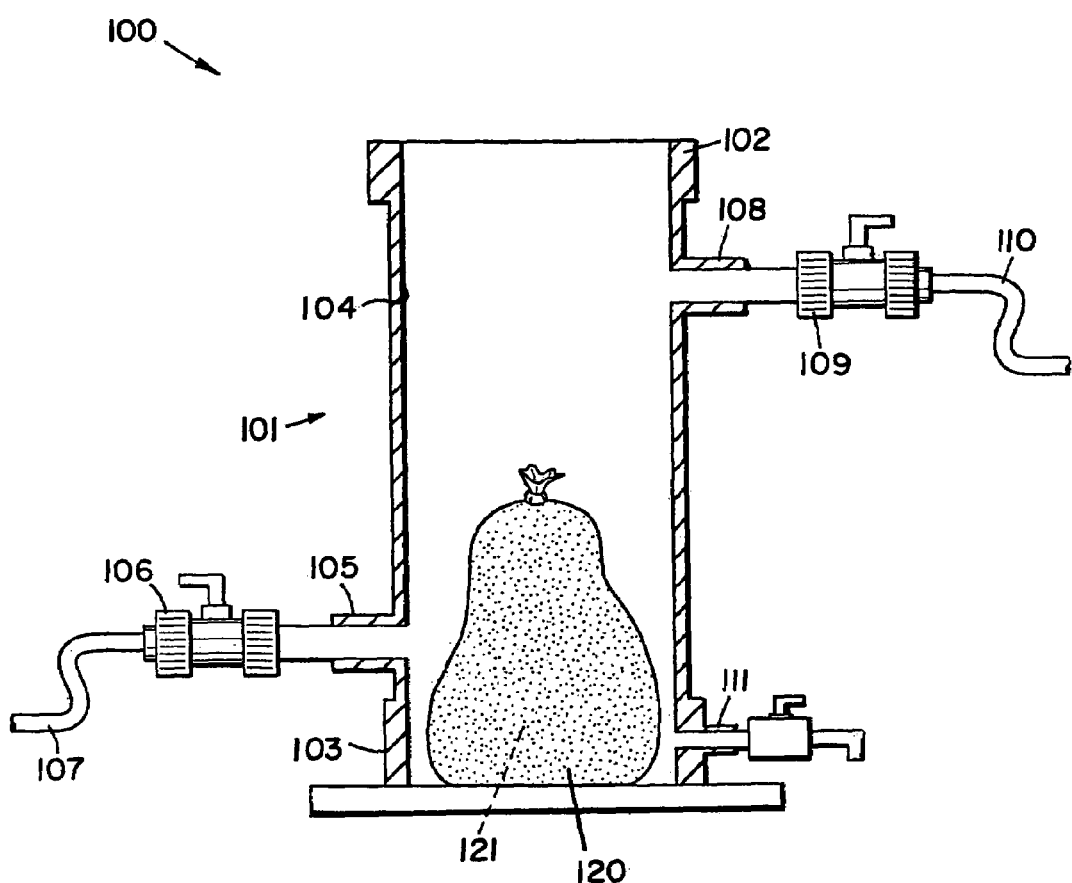
FIG. 3 is a cross section view of the cyanuric acid feeder shown in FIG. 2 with a product dispensing bag.
Figure 4:
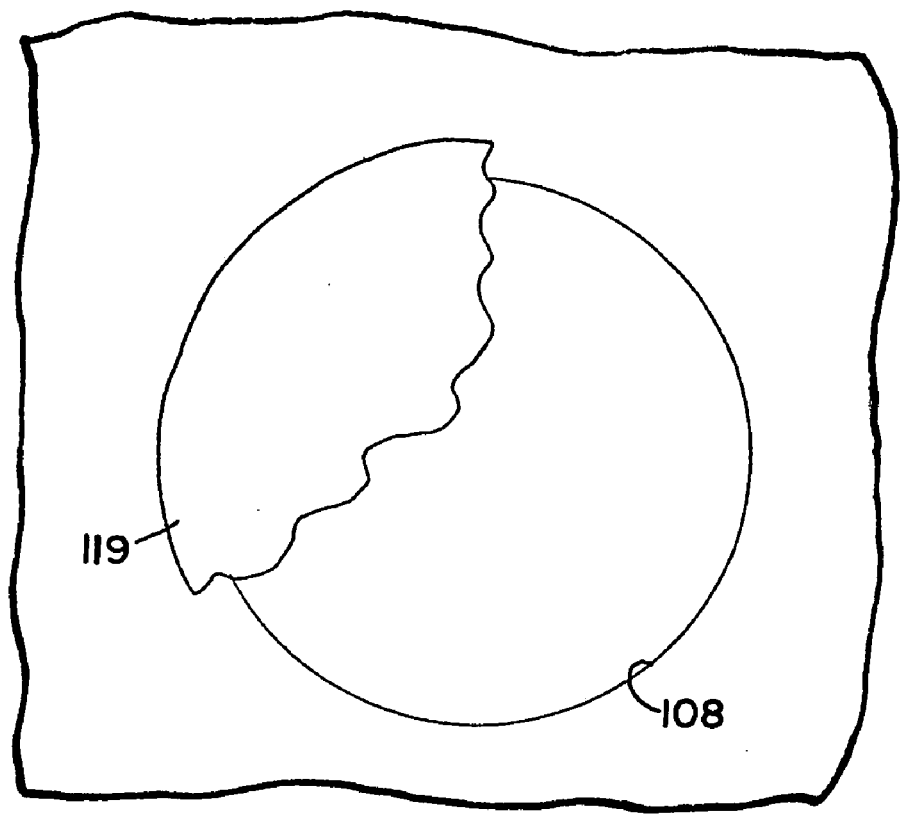
FIG. 4 is a plan view showing a mesh member covering an outlet of the cyanuric acid feeder shown in FIG. 2.

A knee-high nylon stocking may be used as bag 120, however, a knee-high nylon support stocking is not effective because the weave is too tight thereby preventing the cyanuric acid from adequately dissolving and dispensing into the use solution. The bag 120 or the mesh member 119 must have holes small enough to contain the granules of product 121 to prevent clogging of the hose 110 but large enough to allow the cyanuric acid to dissolve and dispense into the use solution. The preferred embodiment utilizes the product dispensing bag 120 because utilizing a mesh member 119 may not prevent the product from clumping proximate the outlet 108, which would prevent the product 121 from being dispensed properly. The mesh member 119 is shown in FIG. 4 and the bag 120 is shown in FIG. 3.

The dispensing rate is controlled by the system, which is the combination of the feeder vessel 100, the solubility of the cyanuric acid 121, and the permeable bag 120 containing the cyanuric acid 121. The feeder vessel 100 has several variables such as the size of the vessel, the shape of the vessel, and the location and the size of the inlet 105 and the outlet 108. These variables control the flow rate of water going through the feeder vessel 100. The cyanuric acid 121 has a solubility of approximately 0.3 grams per 100 ml of water. The permeable bag 120 itself does not have a dispensing rate. The permeable bag 120 holds the cyanuric acid 121 in a certain orientation within the feeder vessel 100 exposing it to the stream of water flowing through the feeder vessel 100 to allow dissolution of the cyanuric acid thereby creating the use solution.

Figure 1:
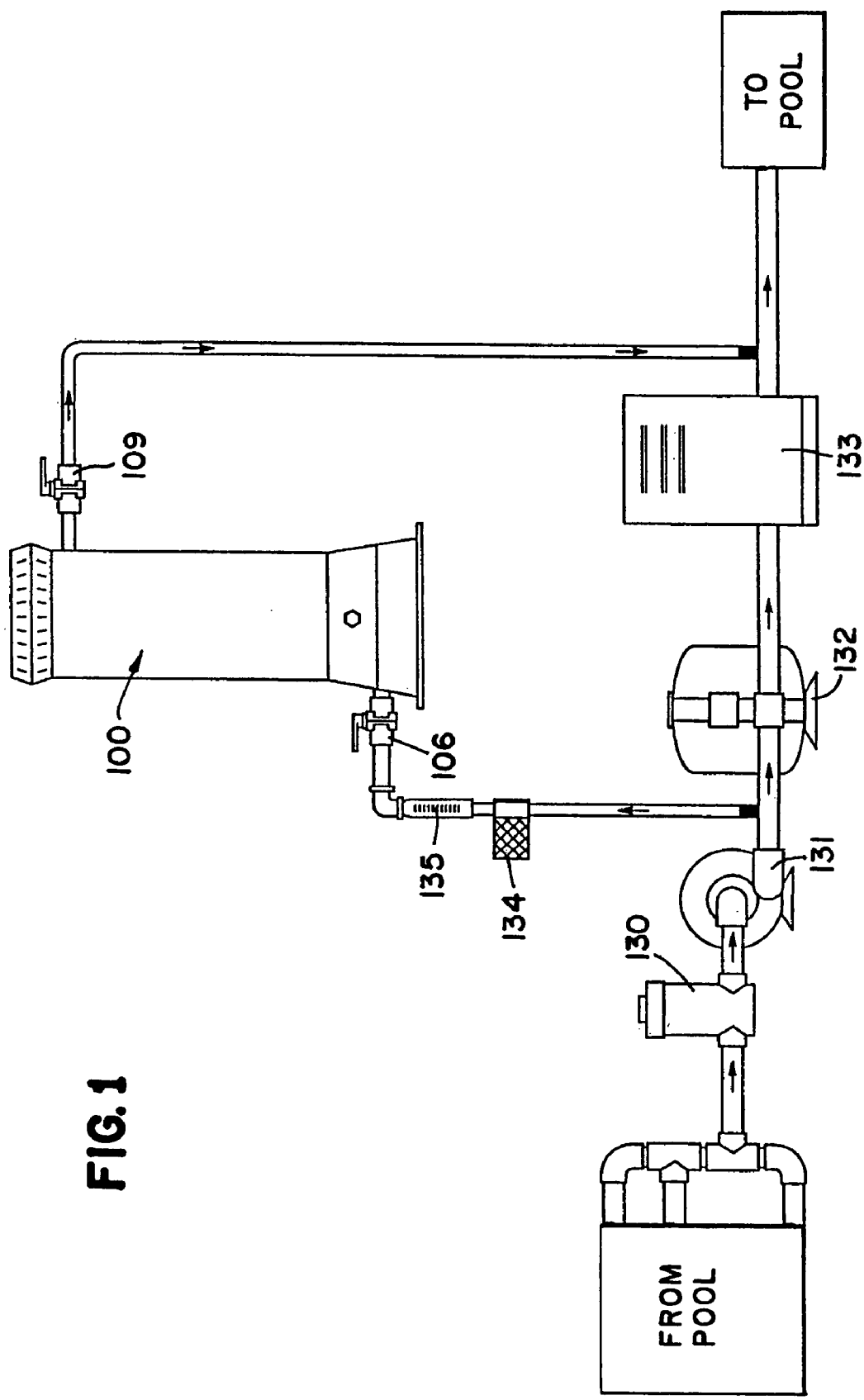
FIG. 1 is a schematic of a swimming pool system having a cyanuric acid feeder.

The flood feeder 100 is plumbed into the existing swimming pool circulation system, as shown in FIG. 1. The existing swimming pool circulation system is represented along the bottom and the cyanuric acid feeder 100 is represented above the existing system. Arrows indicate the direction of water flow through the systems. In the existing system, water flows from the pool through the strainer 130, the pump 131, the filter 132, and the heater 133 before it flows back into the pool. For the cyanuric acid feeder 100, the swimming pool water flows through the strainer 130 and the pump 131 of the existing system and then gets routed to the cyanuric acid feeder 100. The water flows through the strainer 134, the flow meter 135, and the valve 106 into the inlet 105 of the flood feeder 100, where the cyanuric acid is dissolved to create a use solution. The water enters the feeder cavity 104, swirls around within the cavity 104 to dissolve a portion of the product 121 thereby creating a use solution, and the use solution is dispensed into the swimming pool through the outlet 108. The use solution then flows through the valve 109 and goes into the pool after the heater 133. Water typically passes through the feeder 100 at a rate of 0.5 gallon per minute to 8.0 gallons per minute. Once the cyanuric acid level in the use solution is at a desirable level, maintenance doses are dispensed to keep the level relatively constant and thus more effective in stabilizing the chlorine. The valve 106 is a feeder dial that controls the rate of water going through the feeder 100 and therefore controls the rate of cyanuric acid being dispensed by the feeder 100. Although cyanuric acid does not evaporate or otherwise dissipate once it is in the swimming pool water, the level will fall when bathers leave the pool, when the pool water is filled, or when the pool water is vacuumed. Therefore, it is important to replenish this lost product.

The desired amount of cyanuric acid in a swimming pool is calculated using the following equation:

> 10,000 gallons of water in the swimming pool times
> (x) 8.331 pounds per gallon (water weight)
> times (x) desired ppm cyanuric acid divided by
> (/) 1.0 million equals (=) pounds of cyanuric
> acid that must be added Therefore, if 50 ppm of cyanuric acid is desired, then 4.17 pounds of cyanuric acid must be added to a swimming pool containing 10,000 gallons of water. It is important to maintain the correct amount of cyanuric acid in a swimming pool because if too little cyanuric acid is added, the chlorine will not be as stable and if too much cyanuric acid is added, the chlorine will not release properly. The preferred range is 30 to 50 ppm cyanuric acid.

Using the method of the present invention, the delivery rate tests of the feeder 100 and the product dispensing bag 120 are shown in Table 1 below. Table 1 shows that the range of the delivery rate is 0.20 to 1.40 pounds of cyanuric acid per hour, depending upon the flow rate and the temperature of the water.

TABLE 1

Chemical Delivery Rates for Mesh Bag Dispensing Cyanuric Acid Product from Alternate Feeders

| Feeder Type | Water Temperature | Degrees (° F.) | Delivery Rate (pounds per hour) | |
|---|---|---|---|---|
| DSE Version B | hot | 102 | 0.40 | minimum |
| | hot | 102 | 1.40 | maximum |
| | cold | 65 | 0.20 | minimum |
| | cold | 65 | 1.08 | maximum |
| Modufilter | hot | 102 | 0.80 | minimum |
| | hot | 102 | 1.20 | maximum |
| | cold | 65 | 0.02 | minimum |
| | cold | 65 | 1.20 | maximum |

In the preferred embodiment, the flood feeder 100 is used to dispense the cyanuric acid because having a constant level of water within the cavity 104 ensures that the cyanuric acid dissolves to create a sufficient concentration of the product in the use solution necessary to effectively stabilize the chlorine. When cyanuric acid is maintained at proper levels in a swimming pool, both chlorine and cyanuric acid usage amounts are conserved. The flood feeder 100 includes a delivery system that utilizes the water of a current swimming pool to slowly dissolve the cyanuric acid.

To utilize the dispensing method of the present invention, a flood feeder 100 is plumbed into an existing swimming pool circulation system, as shown in FIG. 1. To install the flood feeder 100 into the existing system, a quarter-inch NPT hole is drilled and tapped into the existing system between the discharge of the pool's pump 131 and the filter 132 for insertion of the inlet tubing 107 of the flood feeder 100. Then, another quarter-inch NPT hole is drilled and tapped into the existing system after the heater 133 for insertion of the outlet tubing 110 of the feeder 100. The outlet tubing 110 is preferably installed after the heater 133 because heat will denature the cyanuric acid thereby making it less effective in stabilizing the chlorine. The inlet tubing 107 and the outlet tubing 110 are preferably half-inch clear tubing. Once the inlet tubing 107 and the outlet tubing 110 are operatively connected to their respective holes, they are operatively connected to the inlet 105 and the outlet 108 of the flood feeder 100, respectively. The inlet 105 and the outlet 108 both include ball valves 106 and 109, respectively, to control the amount of water entering and exiting the cavity 104 of the flood feeder 100.

In operation, the product dispensing bag 120 containing product 121 is placed within the cavity 104 of the flood feeder 100. When the ball valves 106 and 109 are in an open position, water as a diluent is allowed to flow into the cavity 104 and dissolves a portion of the product 121 to create a use solution. The use solution then exits the outlet 108 to be dispensed into the pool. The outlet 108 is proximate the top 102 of the housing 101 and the cavity 104 is flooded from the bottom 103 so as the cavity 104 fills from the bottom 103 the use solution proximate the top 102 exits the outlet 108. Therefore, there is always water within cavity 104 to dissolve the product 121.

When the product supply 121 within the product bag 120 has been depleted, the ball valves 106 and 109 should be closed and the drain valve 111 should be opened. Once the water has been drained from the cavity 104, the depleted product bag 120 can be replaced with a full product bag 120. The drain valve 111 should then be closed and the ball valves 106 and 109 should be opened to flood the cavity 104, dissolve a portion of the product 121, and dispense the use solution through outlet 108.

The amount of use solution dispensed into the pool is regulated by the ball valves 106 and 109 in the inlet 105 and the outlet 108, respectively. The more water that is allowed to flow into and out of the flood feeder 100, the more use solution will be dispensed into the pool. To determine how much use solution should be dispensed into the pool, the pool water should be titrated by means well known in the art. If the cyanuric acid level is too high, the flow rates into the feeder 100 should be reduced, and conversely, if the cyanuric acid level is too low, the flow rates into the feeder 100 should be increased. In addition, it is possible to dispense other pool chemicals such as chloro bromo hydantoin or dibromo hydantoin using the method of the present invention.

EXAMPLE 1

A feeder, manufactured by Hayward Pool Products, Inc., model number CL-220, having a maximum pressure of 50 PSI and 0.05 pounds per hour of trichlor, was installed in an outdoor pool containing 18,000 gallons of water. The inlet hose to the feeder was installed on the pool's circulation system after the filter, and the pressure differential across the heater was relied upon to provide a sufficient flow and pressure to dissolve the cyanuric acid inside the feeder. The type of sanitizing agent used in this pool was bleach. The starting cyanuric acid level was 0.0 ppm, the free available chlorine ("FAC") level was 2.5 ppm, and the pH level was 7.4. The pool system flow rate was 80 gallons per minute, and the pump was an American Products Ultra Flow pump. The system included a 1.5 horsepower motor and a 4.6 square feet filter. A push/pull type backwash valve was also included. A Raypack Gas 400,000 BTU's heater was used.

Five pounds of cyanuric acid was added to the feeder at 1:30 p.m. on day one. At 7:30 p.m. on day one, the feeder was at a higher water level and the water was white and foamy in appearance. Using a rod, the consistency was like a thick slurry and there was no caking of the product inside the feeder. Further investigation revealed that the standpipe in the feeder was clogged with cyanuric acid and there was no water flowing through the output tubing of the feeder. The check valve on the outlet side of the feeder was also clogged with cyanuric acid. The check valve was removed from the feeder and then the feeder was returned to service.

On day two at 10:00 a.m., the feeder was re-plumbed to the pressure side of the filter. With the check valve removed, the top of the feeder was extremely hard to remove to check the inside of the feeder to refill with product. Because the problem seemed to be with clogging of the feeder standpipe, some of the product was removed to bring the level of product in the feeder to about an inch below the standpipe. After this change, the cyanuric acid came through the feeder in solid form appearing like white sand on the bottom of the pool. Also, the pH had started to drop and the oxidation reduction potential ("ORP") was also falling.

At 10:30 a.m., the feeder was opened and it was almost perfectly clean inside and the water looked clear. While it appeared that the cyanuric acid was being dispensed into the pool, it was not a reliable system because too much caking and clogging occurred in the feeder.

At 1:00 p.m., all but a few crystals of the cyanuric acid had dissolved. The feeder was refilled to within one inch of the top of the standpipe, and the standpipe clogged again when the feeder was turned back on. A piece of 5/16 inch tubing was then inserted into the standpipe to make the water inside the feeder rise to within one inch of the top of the feeder. This allowed for some "freeboard" inside the feeder for the product to mix before exiting the standpipe and into the pool. However, the feeder seemed to be dispensing cyanuric acid again; the granules were still coming out into the pool. Even though the cyanuric acid was being dispensed into the pool, it was not desirable to use this type of dispensing system in the pool because swimmers would be in contact with the granules and see them being dispensed into the pool through the return eyelets.

At 5:00 p.m., five pounds of cyanuric acid product was placed in a knee-high stocking and the end of the stocking was tied in a knot before being placed inside the feeder. The elongated standpipe was left in the feeder to observe the difference in dispensing with the whole product-filled stocking immersed in water before being dispensed into the pool. The check valve was also re-installed in the outlet side of the feeder and as a result the top of the feeder was much easier to remove because it was not under constant pressure.

On day three at 8:00 a.m., the swimming pool chemistry levels were checked and the following readings were taken: 30 ppm cyanuric acid, 4.0 ppm FAC, and pH 7.0. The top of the feeder was opened, and it was found that almost all of the cyanuric acid had dissolved into a use solution into the pool. The water in the feeder was clear and the tubing was free of cyanuric acid sediment. Some dirt and debris was found inside the stocking, however, it was apparently from the impurities in the cyanuric acid when it was packaged.

At 10:00 a.m., the feeder was checked and the cyanuric acid was completely gone. The cyanuric acid level had increased to 35 ppm and the only material left in the stocking was the dirt and debris. Another product-filled stocking was added to the feeder and the control valve located proximate the inlet was placed on the "1" setting. This test was performed to determine how long it would take to erode the product, how the product would hold up over time, and whether the product would revert to another form when soaked in water over a long period of time. At 2:00 p.m., there was very little product eroded from the stocking inside the feeder when the inlet valve was set at a lower setting and there was little change in the physical appearance of the product.

EXAMPLE 2

A feeder, manufactured by Hayward Pool Products, Inc., model number CL-220, having a maximum pressure of 50 PSI and 0.05 pounds per hour of trichlor, was installed in an outdoor pool containing 16,600 gallons of water. The inlet hose to the feeder was installed on the pool's circulation system in the pressure side of the filter and returned to the pool after the heater. The type of sanitizing agent used in this pool was bleach. The starting cyanuric acid level was 0.0 ppm, the FAC level was 2.5 ppm, and the pH level was 7.0. The pool system flow rate was 55 gallons per minute, and the pump was a Sta-Rite Maxi Glass pump. The system included a 1.5 horsepower motor and a 4.9 square feet filter. A push/pull type backwash valve was also included. A Raypack Gas 400,000 BTU's heater was used.

On day one at 3:30 p.m., five pounds of cyanuric acid was added to the feeder by first placing the product into a knee-high stocking and then inserting it into the feeder. The standpipe was not modified with 5/16 inch tubing as in the previous example and, therefore, only half of the product-filled stocking was immersed in water while the feeder was in operation.

On day three at 8:00 a.m., the product had completely dissolved in the feeder and only the empty stocking remained in the feeder. The standpipe was then extended so that more of the product was immersed with water to increase the speed at which the cyanuric acid would dissolve. Another product-filled stocking was added and the feeder was set at a setting of "1.5."

On day five at 1:00 p.m., very little product had eroded from the stocking when the feeder was set at this lower setting.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of dispensing cyanuric acid into a swimming pool, comprising:
   providing a chemical consisting of cyanuric acid;
   providing a permeable bag into which said cyanuric acid is placed;
   placing said permeable bag containing said cyanuric acid into a cavity of a feeder having an inlet and an outlet, said inlet and said outlet being in fluid communication with said cavity;
   supplying water to said inlet and allowing said water to flood said cavity thereby dissolving a portion of said cyanuric acid to create a use solution, said inlet regulating an amount of water flowing into said cavity; and
   allowing said use solution to exit said cavity through said outlet and flow into a swimming pool, said outlet regulating an amount of use solution flowing out of said cavity.

2. The method of claim 1, wherein said cyanuric acid is dispensed from said outlet at a rate of approximately 0.5 to 8.0 gallons per minute.

3. The method of claim 1, wherein said cyanuric acid, said permeable bag, and said feeder have a dispensing rate of approximately 0.20 to 1.40 pounds of cyanuric acid per hour.

4. The method of claim 1, the swimming pool having a circulation system with a pump and a heater, wherein said inlet is installed after the pump and said outlet is installed after the heater, whereby said feeder is in fluid communication with the circulation system.

5. A method of dispensing cyanuric acid into a swimming pool, comprising:
   providing a chemical consisting of cyanuric acid;
   providing a feeder having a water inlet, a cavity, and a use solution outlet, said water inlet and said use solution outlet being in fluid communication with said cavity;
   placing a permeable member between said cyanuric acid and said use solution outlet, wherein said permeable member prevents said cyanuric acid from exiting said cavity through said use solution outlet;
   placing said cyanuric acid in said cavity;
   supplying water to said water inlet, said water inlet regulating an amount of water entering said cavity, wherein said water enters said cavity and dissolves a portion of said cyanuric acid thereby creating a use solution; and
   allowing said use solution to exit said cavity through said use solution outlet and flowing into the swimming pool, said use solution outlet regulating an amount of use solution exiting said cavity.

6. The method of claim 5, wherein said permeable member is a bag containing said cyanuric acid.

7. The method of claim 5, wherein said permeable member is a mesh member covering said use solution outlet.

8. The method of claim 5, the swimming pool having a circulation system with a pump and a heater, wherein said inlet is installed after the pump and said outlet is installed after the heater, whereby said feeder is in fluid communication with the circulation system.

9. A method of stabilizing chlorine dispensed with a dispenser in a swimming pool, comprising:

placing a chemical consisting of cyanuric acid into a cavity of a container having an inlet and an outlet, said inlet and said outlet being in fluid communication with said cavity;

supplying said container with a diluent, said inlet regulating an amount of diluent entering said cavity, said diluent entering said cavity via said inlet and dissolving a portion of said cyanuric acid thereby creating a use solution;

allowing said use solution to exit said cavity via said outlet, said outlet regulating an amount of use solution exiting said cavity; and dispensing said use solution into the swimming pool, wherein said cyanuric acid stabilizes the chlorine in the swimming pool, said container reducing an occurrence of cyanuric acid block in the swimming pool.

10. The method of claim 9, further comprising placing a permeable member between said cyanuric acid and said outlet, said permeable member preventing cyanuric acid that has not been dissolved into said use solution from exiting said cavity through said outlet.

11. The method of claim 10, wherein said permeable member is a bag containing said cyanuric acid.

12. The method of claim 10, wherein said permeable member is a mesh member covering said outlet.

13. The method of claim 9, further comprising:

connecting said inlet of said container to a first conduit interconnecting a pump and a filter of an existing circulation system of the swimming pool;

connecting said outlet of said container to a second conduit after a heater of said existing circulation system of the swimming pool; and allowing water from said existing circulation system to be routed into said cavity to create said use solution which is then dispensed into the swimming pool.

14. A method of stabilizing chlorine dispensed with a dispenser in a swimming pool, the swimming pool including a circulation system having a water pump, a filter, and a heater, comprising:

providing a feeder having an inlet, a cavity, and an outlet;

connecting said inlet to the circulation system between the water pump and the filter with a first conduit;

connecting said outlet to the circulation system after the heater with a second conduit;

placing a chemical consisting of cyanuric acid into said cavity of said feeder;

providing means for preventing said cyanuric acid from flowing out of said outlet in a solid form;

flooding said cavity with water received from the circulation system via said inlet, said inlet regulating an amount of water entering said cavity;

dissolving a portion of said cyanuric acid thereby creating a use solution;

allowing said use solution to exit said outlet, said outlet regulating an amount of use solution exiting said cavity; and routing said use solution into the swimming pool, said feeder reducing an occurrence of cyanuric acid block in the swimming pool.

15. The method of claim 14, wherein the means for preventing said cyanuric acid from flowing out of said outlet in solid form is a permeable bag containing said cyanuric acid.

16. The method of claim 14, wherein the means for preventing said cyanuric acid from flowing out of said outlet in solid form is a permeable member placed over said outlet.

17. The method of claim 1, wherein said permeable bag containing said cyanuric acid is replaced with a new permeable bag containing cyanuric acid when said cyanuric acid has been depleted from said permeable bag.

18. The method of claim 6, wherein said bag containing said cyanuric acid may be replaced with a new bag containing cyanuric acid when said cyanuric acid has been depleted from said bag.

19. The method of claim 11, wherein said bag containing said cyanuric acid may be replaced with a new bag containing cyanuric acid when said cyanuric acid has been depleted from said bag.

20. The method of claim 15, wherein said permeable bag may be replaced with a new permeable bag containing cyanuric acid when said cyanuric acid has been depleted from said permeable bag.

* * * * *